(12) United States Patent
Ukegawa et al.

(10) Patent No.: US 10,099,680 B2
(45) Date of Patent: Oct. 16, 2018

(54) HYBRID VEHICLE

(71) Applicant: TOYOTA JIDOSHA KABUSHIKI KAISHA, Toyota-shi, Aichi-ken (JP)

(72) Inventors: Hiroshi Ukegawa, Okazaki (JP); Makoto Oishi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 137 days.

(21) Appl. No.: 15/415,423

(22) Filed: Jan. 25, 2017

(65) Prior Publication Data

US 2017/0225671 A1 Aug. 10, 2017

(30) Foreign Application Priority Data

Feb. 4, 2016 (JP) ................................ 2016-019900

(51) Int. Cl.
| | |
|---|---|
| *B60K 6/365* | (2007.10) |
| *B60W 20/13* | (2016.01) |
| *B60K 6/28* | (2007.10) |
| *B60K 6/445* | (2007.10) |
| *B60L 3/00* | (2006.01) |

(Continued)

(52) U.S. Cl.
CPC ............... *B60W 20/13* (2016.01); *B60K 6/28* (2013.01); *B60K 6/365* (2013.01); *B60K 6/445* (2013.01); *B60L 3/0084* (2013.01); *B60L 11/14* (2013.01); *B60L 11/1803* (2013.01); *B60L 15/007* (2013.01); *B60W 50/0205* (2013.01); *B60L 2210/10* (2013.01); *B60Y 2200/92* (2013.01); *Y02T 10/70* (2013.01); *Y02T 10/7005* (2013.01); *Y02T 10/7077* (2013.01); *Y02T 10/7216* (2013.01); *Y10S 903/91* (2013.01)

(58) Field of Classification Search
CPC ... B60W 20/13; B60W 50/0205; B60K 6/445; B60K 6/365; B60K 6/28; B60L 11/1803; B60L 15/007; B60L 3/0084; B60L 2210/10; B60Y 2200/92; Y10S 903/91
See application file for complete search history.

(56) References Cited

U.S. PATENT DOCUMENTS 5,991,683 A * 11/1999 Takaoka ................... B60K 6/40
701/102
2009/0284198 A1 11/2009 Shimana et al.

FOREIGN PATENT DOCUMENTS

| JP | 2001-320806 A | 11/2001 |
|---|---|---|
| JP | 2009-278791 A | 11/2009 |

OTHER PUBLICATIONS

U.S. Appl. No. 15/297,506, filed Oct. 19, 2016 in the name of Tomoko Oba et al.

* cited by examiner

*Primary Examiner* — Mark J Beauchaine
(74) *Attorney, Agent, or Firm* — Oliff PLC

(57) ABSTRACT

A hybrid vehicle includes a first controller configured to output a first control signal for a first inverter, a second controller configured to output a second control signal for a second inverter and a third control signal for the first inverter, and a selection circuit configured to output either of the first control signal or the third control signal to the first inverter. The third control signal is a signal for simultaneously turning on either of upper arm switching elements or lower arm switching elements of a plurality of arms of the first inverter. The second controller starts an engine by outputting the third control signal while outputting the second control signal to drive a second motor generator when abnormality occurs in the first controller.

6 Claims, 13 Drawing Sheets

(51) Int. Cl.
*B60L 11/18* (2006.01)
*B60L 15/00* (2006.01)
*B60W 50/02* (2012.01)
*B60L 11/14* (2006.01)

FIG. 9

| | STATE | SIGNAL | | 1MG DRIVE MODE |
|---|---|---|---|---|
| | | RUN PULSE SIGNAL | THIRD CONTROL SIGNAL | |
| A | NORMAL | NORMAL | NON-OUTPUT | NORMAL DRIVE |
| B | 1MG ECU ABNORMAL | ABNORMAL | OUTPUT | THREE-PHASE SHORT-CIRCUIT |
| C | THIRD CONTROL SIGNAL ABNORMAL | NORMAL | OUTPUT | NORMAL DRIVE |

HYBRID VEHICLE

INCORPORATION BY REFERENCE

The disclosure of Japanese Patent Application No. 2016-019900 filed on Feb. 4, 2016 including the specification, drawings and abstract is incorporated herein by reference in its entirety.

BACKGROUND

1. Field of the Disclosure

The present disclosure relates to a hybrid vehicle.

2. Description of Related Art

A hybrid vehicle is disclosed in Japanese Patent Application Publication No. 2001-320806 (JP 2001-320806 A). This hybrid vehicle includes an engine, a first motor generator, an output shaft connected to drive wheels, a planetary gear mechanism configured to connect the engine, the first motor generator, and the output shaft to one another, and a second motor generator connected to the output shaft. This hybrid vehicle further includes a battery electrically connected to the first motor generator and the second motor generator, a first inverter configured to convert electric power between the battery and the first motor generator, a second inverter configured to convert electric power between the battery and the second motor generator, a first controller configured to output a first control signal for the first inverter, and a second controller configured to output a second control signal for the second inverter.

In the above-described hybrid vehicle, power output from the engine is distributed to the output shaft and the first motor generator through the planetary gear mechanism. The first motor generator primarily functions as a power generator, and electric power generated by the first motor generator is supplied to the battery and the second motor generator. The first motor generator also functions as a starter motor for starting the engine. The second motor generator is driven with electric power supplied from the battery and the second motor generator, and applies power to the output shaft. The second motor generator functions as a power generator which generates electric power with power from the output shaft when the hybrid vehicle is braked. The operations of the first motor generator and the second motor generator are respectively controlled by the first control signal output from the first controller and the second control signal output from the second controller.

SUMMARY

In the hybrid vehicle of JP 2001-320806 A, when an abnormality occurs in the first controller, it is not possible to control the first motor generator. Accordingly, when an abnormality occurs in the first controller, retreat traveling only using the second motor generator is executed. In the retreat traveling, if power generation with the engine and the first motor generator is performed, it is possible to improve a traveling distance according to the retreat traveling. However, when an abnormality occurs in the first controller, it is not possible to drive the first motor generator and to start the engine. Accordingly, when an abnormality occurs in the first controller, and when the engine is stopped, it is not possible to perform power generation with the engine and the first motor generator in subsequent retreat traveling.

The disclosure provides a technique capable of starting the engine even if an abnormality occurs in the first controller.

A first aspect of the disclosure provides a hybrid vehicle including an engine, a first motor generator, an output shaft connected to drive wheels, a planetary gear mechanism configured to connect the engine, the first motor generator, and the output shaft to one another, a second motor generator connected to the output shaft, a battery electrically connected to the first motor generator and the second motor generator, a first inverter configured to convert electric power between the battery and the first motor generator, a second inverter configured to convert electric power between the battery and the second motor generator, a first controller configured to output a first control signal for the first inverter, a second controller configured to output a second control signal for the second inverter and a third control signal for the first inverter, and a selection circuit configured to output either of the first control signal from the first controller or the third control signal from the second controller to the first inverter. The first inverter has a plurality of first upper arm switching elements and a plurality of first lower arm switching elements, the third control signal includes a signal for simultaneously turning on either of the plurality of first upper arm switching elements or the plurality of first lower arm switching elements, and the second controller starts the engine by outputting the third control signal while outputting the second control signal to drive the second motor generator when an abnormality occurs in the first controller.

In the above-described hybrid vehicle, when an abnormality occurs in the first controller, the second controller can output the third control signal for the first inverter in addition to the second control signal for the second inverter. If the second controller outputs the second control signal, the second motor generator is driven, and the hybrid vehicle travels. While the hybrid vehicle is traveling, the output shaft rotates. The output shaft is connected to the engine and the first motor generator through the planetary gear mechanism. If all switching elements of the first inverter are in an off state, the first motor generator runs idle, and the engine continues to be stopped. In this state, if the second controller outputs the third control signal, the first motor generator is short-circuited through the first inverter, and the first motor generator generates a braking force. As a result, torque is applied from the planetary gear mechanism to the engine, and the engine rotates. With the use of this rotation, it is possible to start the engine. In this way, according to the above-described hybrid vehicle, even when an abnormality occurs in the first controller, it is possible to start the engine using the second controller. With this, it is possible to perform power generation with the engine and the first motor generator during retreat traveling, and to improve the traveling distance in retreat traveling by supplying electric power to the second motor generator.

In the above-described aspect, the second controller may be configured not to output the third control signal when a short-circuit fault occurs in at least one of the plurality of first upper arm switching elements or at least one of the plurality of first lower arm switching elements.

In the above-described aspect, the hybrid vehicle may further include an abnormality detection circuit configured to detect an abnormality in the first controller, and the selection circuit may be connected to the abnormality detection circuit and may be configured to output the third control signal from the second controller to the first inverter when the abnormality detection circuit detects the abnormality in the first controller.

In the above-described aspect, the hybrid vehicle may further include a DC-DC converter configured to transform DC power between the battery and the first inverter, the DC-DC converter may have a second upper arm switching element and a second lower arm switching element which are controlled by a fourth control signal output from the first controller, and the second controller may be configured to further output a fifth control signal for turning on the second upper arm switching element after the engine is started by the second control signal and the third control signal.

A second aspect of the disclosure provides a hybrid vehicle including an engine, a first motor generator, an output shaft connected to drive wheels, a planetary gear mechanism including a sun gear connected to the first motor generator, a planetary gear connected to the engine through a carrier, and a ring gear connected to the output shaft, a second motor generator connected to the output shaft, a battery electrically connected to the first motor generator and the second motor generator, a first inverter having a plurality of first upper arm switching elements and a plurality of first lower arm switching element, the first inverter being configured to convert electric power between the battery and the first motor generator, a second inverter configured to convert electric power between the battery and the second motor generator, a first controller configured to control an operation of the first inverter and to output a first control signal for driving the first motor generator, a second controller configured to control an operation of the second inverter and to output a second control signal for driving the second motor generator and a third control signal for simultaneously turning on either of the plurality of first upper arm switching elements or the plurality of first lower arm switching elements, and a selection circuit configured to either of the first control signal from the first controller or the third control signal from the second controller to the first inverter and to output the third control signal to the first inverter when an abnormality occurs in the first controller.

In the above-described aspect, the hybrid vehicle may further include a DC-DC converter having a second upper arm switching element and a second lower arm switching element, the DC-DC converter being configured to transform DC power between the battery and the first inverter, the first controller may be configured to output a fourth control signal for controlling the DC-DC converter, and the second controller may be configured to output the second control signal and the third control signal, and then, to output a fifth control signal for turning on the second upper arm switching element after the engine is started.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 9 relates to the modification example shown in FIG. 8, and is a table showing a drive mode of the first motor generator 24 during normal operation (A column), when a first motor control unit is abnormal (B column), and when a third control signal is abnormal (C column);

DETAILED DESCRIPTION OF EMBODIMENTS

Figure 1:
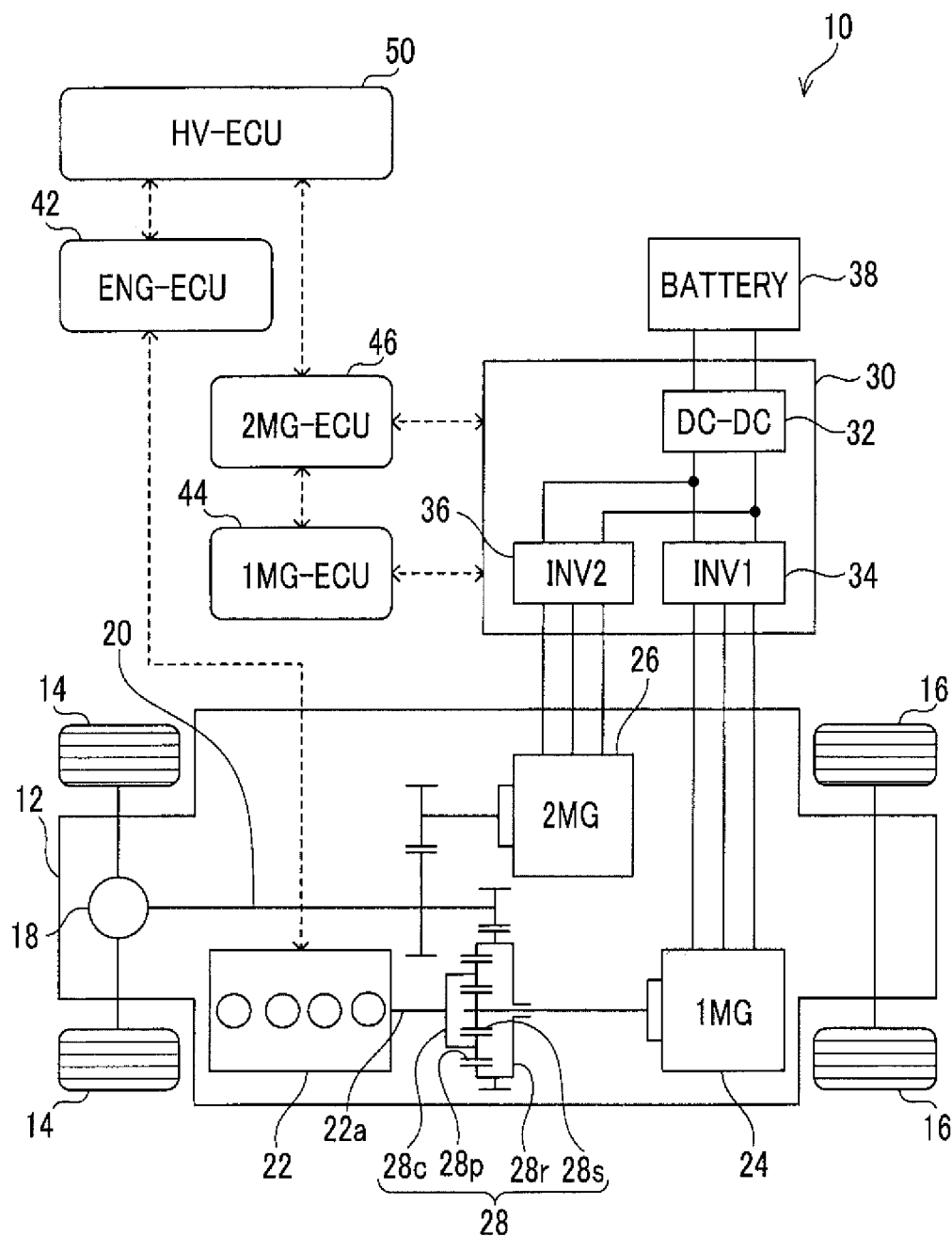
FIG. 1 is a block diagram schematically showing the configuration of a hybrid vehicle 10.

A hybrid vehicle 10 of an example will be described referring to the drawings. As shown in FIG. 1, the hybrid vehicle 10 of the example includes vehicle body 12, and four wheels 14, 16 supported rotatably with respect to the vehicle body 12. The four wheels 14, 16 include a pair of drive wheels 14 and a pair of driven wheels 16. A pair of drive wheels 14 are connected to an output shaft 20 through a differential gear 18. The output shaft 20 is supported rotatably with respect to the vehicle body 12. Though in one example, a pair of drive wheels 14 are front wheels which are positioned in the front portion of the vehicle body 12, and a pair of driven wheels 16 are rear wheels which are positioned in the rear portion of the vehicle body 12. A pair of drive wheels 14 are arranged coaxially to each other, and a pair of driven wheels 16 are arranged coaxially to each other.

The hybrid vehicle 10 further includes an engine 22, a first motor generator 24 (in the drawing, 1MG), and a second motor generator 26 (in the drawing, 2MG). The engine 22 is a displacement type internal combustion engine, and combusts gasoline or other kinds of fuel to output power. Each of the first motor generator 24 and the second motor generator 26 is a three-phase motor generator having a U-phase, a V-phase, and a W-phase. In the following description, the first motor generator 24 and the second motor generator 26 are respectively simply referred to as a first motor 24 and a second motor 26. The engine 22 is connected to the output shaft 20 and the first motor 24 through a planetary gear mechanism 28. The planetary gear mechanism 28 is a kind of a power distribution mechanism, and distributes power output from the engine 22 to the output shaft 20 and the first motor 24. The second motor 26 is connected to the output shaft 20, and transmits power between the second motor 26 and the output shaft 20.

The planetary gear mechanism 28 has a sun gear 28s, a carrier 28c, a ring gear 28r, and a plurality of planetary gears 28p. The sun gear 28s, the carrier 28c, and the ring gear 28r are arranged coaxially. A plurality of planetary gears 28p are supported rotatably by the carrier 28c, and are positioned between the sun gear 28s and the ring gear 28r. Each of the planetary gears 28*p* is engaged with both of external gears provided in the sun gear 28*s* and internal gears provided in the ring gear 28*r*, and revolves around the sun gear 28*s* while rotating. The sun gear 28*s* is connected to the first motor 24, the carrier 28*c* is connected to the engine 22 (in detail, a crank shaft 22*a* of the engine 22), and the ring gear 28*r* is connected to the output shaft 20.

The hybrid vehicle 10 further includes a power conversion circuit 30 and a battery 38. The battery 38 is electrically connected to the first motor 24 and the second motor 26 through the power conversion circuit 30. The battery 38 is a rechargeable secondary battery, and though in an example, has a plurality of lithium-ion cells. The power conversion circuit 30 has a first inverter 34 (in the drawing, INV1) and a second inverter 36 (in the drawing, INV2). The first inverter 34 converts electric power between the battery 38 and the first motor 24, and the second inverter 36 converts electric power between the battery 38 and the second motor 26. In detail, the first inverter 34 can convert DC power from the battery 38 to AC power and can supply AC power to the first motor generator 24. The first inverter 34 can convert AC power from the first motor generator 24 to DC power and can supply DC power to the battery 38. Similarly, the second inverter 36 can convert DC power from the battery 38 to AC power and can supply AC power to the second motor generator 26. The second inverter 36 can convert AC power from the second motor generator 26 to DC power and can supply DC power to the battery 38.

The power conversion circuit 30 of this example further includes a DC-DC converter 32 (in the drawing, DC-DC), and the first inverter 34 and the second inverter 36 are connected to the battery 38 through the DC-DC converter 32. The DC-DC converter 32 is a boostable and deboostable DC-DC converter. The DC-DC converter 32 can boost DC power from the battery 38 and can supply DC power to the first inverter 34 and the second inverter 36. The DC-DC converter 32 can deboost DC power from the first inverter 34 and the second inverter 36 and can supply DC power to the battery 38. In the power conversion circuit 30, for example, when a rated voltage of the battery 38 is sufficiently high, the DC-DC converter 32 is not necessarily required.

The hybrid vehicle 10 further includes an engine control unit 42 (in the drawing, ENG-ECU), a first motor control unit 44 (in the drawing, 1MG-ECU), a second motor control unit 46 (in the drawing, 2MG-ECU), and a hybrid control unit 50 (in the drawing, HV-ECU). The engine control unit 42 is connected to be communicable with the engine 22, and monitors and controls the operation of the engine 22. The first motor control unit 44 is connected to be communicable with the power conversion circuit 30, and primarily controls the operations of the DC-DC converter 32 and the first inverter 34. The second motor control unit 46 is connected to be communicable with the power conversion circuit 30, and primarily controls the operation of the second inverter 36. The hybrid control unit 50 is a higher control unit which is connected to be communicable with the engine control unit 42, the first motor control unit 44, and the second motor control unit 46, and gives operation commands to these control units. Though in an example, the hybrid control unit 50 in this example is connected to be communicable with the first motor control unit 44 through the second motor control unit 46.

Figure 2:
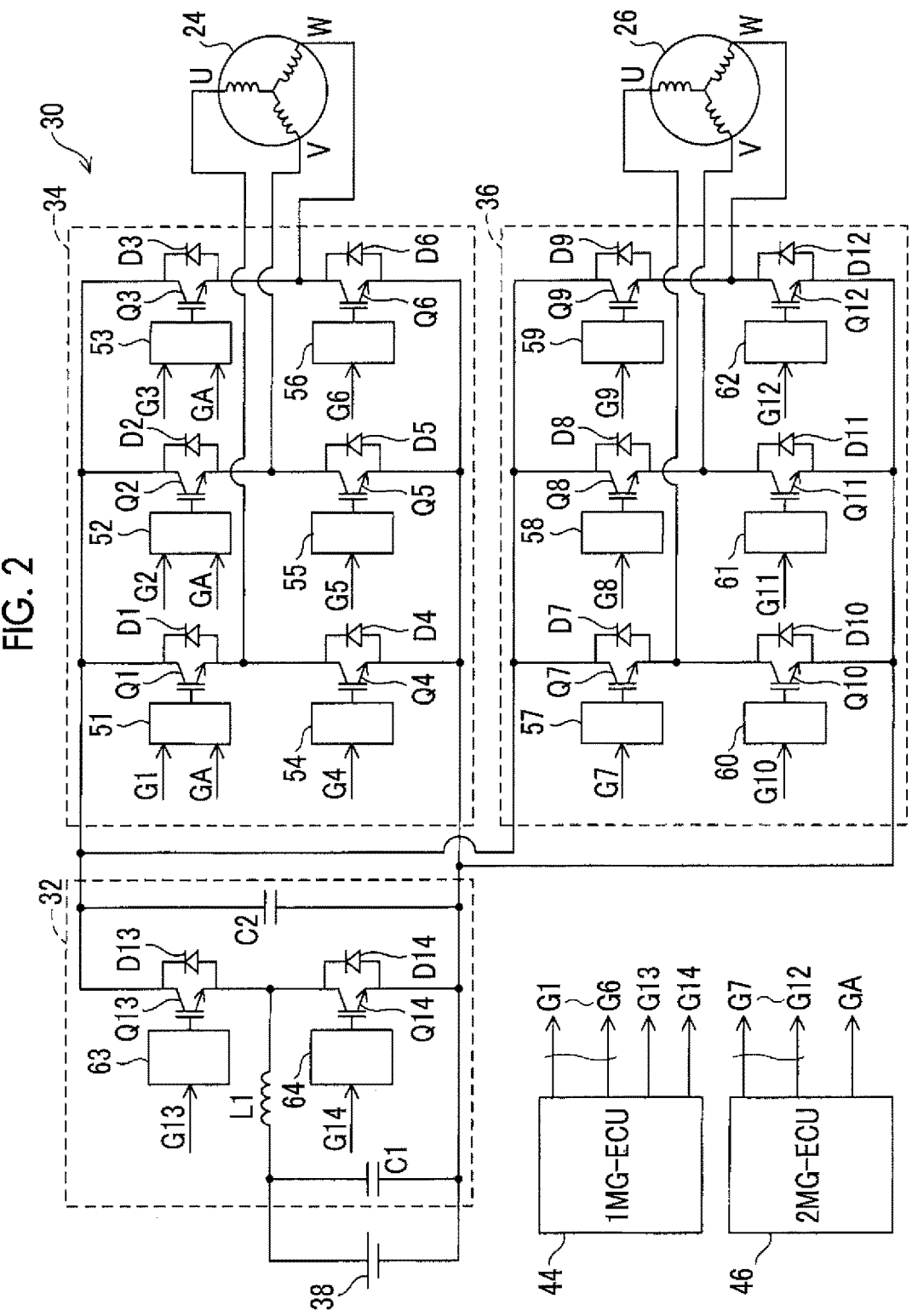
FIG. 2 is a circuit diagram showing the configuration of a power conversion circuit 30.

Referring to FIG. 2, the configurations of the first inverter 34, the second inverter 36, and the DC-DC converter 32 will be described. The first inverter 34 has a plurality of switching elements Q1 to Q6. The first inverter 34 is a three-phase inverter, and has a U-phase arm having an upper arm switching element Q1 and a lower arm switching element Q4, a V-phase arm having an upper arm switching element Q2 and a lower arm switching element Q5, and a W-phase arm having an upper arm switching element Q3 and a lower arm switching element Q6. Diode D1 to D6 are respectively connected in reversely parallel with the switching elements Q1 to Q6. A basic structure of the first inverter 34 is the same as that of a known three-phase inverter, and a detailed structure of the first inverter 34 is not particularly limited.

The operation of the first inverter 34 is controlled by the first motor control unit 44. The first motor control unit 44 outputs first control signals G1 to G6 for a plurality of switching elements Q1 to Q6 of the first inverter 34. The first control signals G1 to G6 are respectively input to the switching elements Q1 to Q6 through drive circuits 51 to 56. The drive circuits 51 to 56 level-shift the first control signals G1 to G6 from the first motor control unit 44 to voltages suitable for the switching elements Q1 to Q6. The first control signals G1 to G6 are, for example, signals for selectively turning on and off switching elements Q1 to Q6 such that the first inverter 34 outputs AC power. That is, the first motor control unit 44 outputs the first control signals G1 to G6, thereby driving the first motor 24. The drive circuits 51 to 56 are configured to monitor an abnormality, such as short-circuit, overheat, or overcurrent, in the switching elements Q1 to Q6, and when the abnormality is detected, to output a fail signal to the first motor control unit 44 and the second motor control unit 46.

The second inverter 36 has a plurality of switching elements Q7 to Q12. The second inverter 36 is a three-phase inverter the same as the first inverter 34, and a U-phase arm having an upper arm switching element Q7 and a lower arm switching element Q10, a V-phase arm having an upper arm switching element Q8 and a lower arm switching element Q11, and a W-phase arm having an upper arm switching element Q9 and a lower arm switching element Q12. Diodes D7 to D12 are respectively connected in reversely parallel with the switching element Q7 to Q12. A basic structure of the second inverter 36 is the same as that of a known three-phase inverter, and a detailed structure of the second inverter 36 is not particularly limited.

The operation of the second inverter 36 is controlled by the second motor control unit 46. The second motor control unit 46 outputs second control signals G7 to G12 for a plurality of switching elements Q7 to Q12 of the second inverter 36. Though details will be described below, the second motor control unit 46 can also output a third control signal GA for the upper arm switching elements Q1 to Q3 of the first inverter 34, in addition to the second control signals G7 to G12. The second control signals G7 to G12 are respectively input to the switching element Q7 to Q12 through drive circuits 57 to 62. The drive circuits 57 to 62 level-shift the second control signals G7 to G12 from the second motor control unit 46 to voltages suitable for the switching element Q7 to Q12. The second control signals G7 to G12 are, for example, signals for selectively turning on and off the switching element Q7 to Q12 such that the second inverter 36 outputs AC power. That is, the second motor control unit 46 outputs the second control signals G7 to G12, thereby driving the second motor 26. In the second inverter 36, the drive circuits 57 to 62 monitor an abnormality, such as short-circuit, overheat, or overcurrent, in the switching element Q7 to Q12, and when the abnormality is detected, outputs a fail signal to the first motor control unit 44 and the second motor control unit 46.

The DC-DC converter 32 includes a first capacitor C1, an inductor L1, an upper arm switching element Q13, a lower arm switching element Q14, an upper arm diode D13, a lower arm diode D14, and a second capacitor C2. The upper arm switching element Q13 and the lower arm switching element Q14 are connected in series with each other, and the series circuit is connected in parallel with the respective arms of the first inverter 34 and the second inverter 36. A connection point between the upper arm switching element Q13 and the lower arm switching element Q14 is connected to a positive electrode of the battery 38 through the inductor L1. The upper arm diode D13 is connected in reversely parallel with the upper arm switching element Q13, and the lower arm diode D14 is connected in reversely parallel with the lower arm switching element Q14. The first capacitor C1 is connected in parallel with the battery 38, and the second capacitor C2 is connected in parallel with each of the first inverter 34 and the second inverter 36. In the DC-DC converter 32, a boost converter is primarily constituted of the inductor L1, the upper arm diode D13, and the lower arm switching element Q14. A deboost converter is primarily constituted of the inductor L1, the upper arm switching element Q13, and the lower arm diode D14.

The operation of the DC-DC converter 32 is controlled by the first motor control unit 44. The first motor control unit 44 outputs fourth control signals G13, G14 for the upper arm switching element Q13 and the lower arm switching element Q14 of the DC-DC converter 32. The fourth control signals G13, G14 are respectively input to the switching elements Q13, Q14 through drive circuits 63, 64. The drive circuits 63, 64 level-shift the fourth control signals G13, G14 from the first motor control unit 44 to voltages suitable for the switching elements Q13, Q14. The fourth control signal G13 for the upper arm switching element Q13 intermittently turns on the upper arm switching element Q13, thereby making the DC-DC converter 32 function as a deboost converter. The fourth control signal G14 for the lower arm switching element Q14 intermittently turns on the lower arm switching element Q14, thereby making the DC-DC converter 32 function as a boost converter. The drive circuits 63, 64 are configured to monitor an abnormality, such as short-circuit, overheat, or overcurrent, in the upper arm switching element Q13 and the lower arm switching element Q14, and when abnormality is detected, to output a fail signal to the first motor control unit 44 and the second motor control unit 46.

Figure 3:
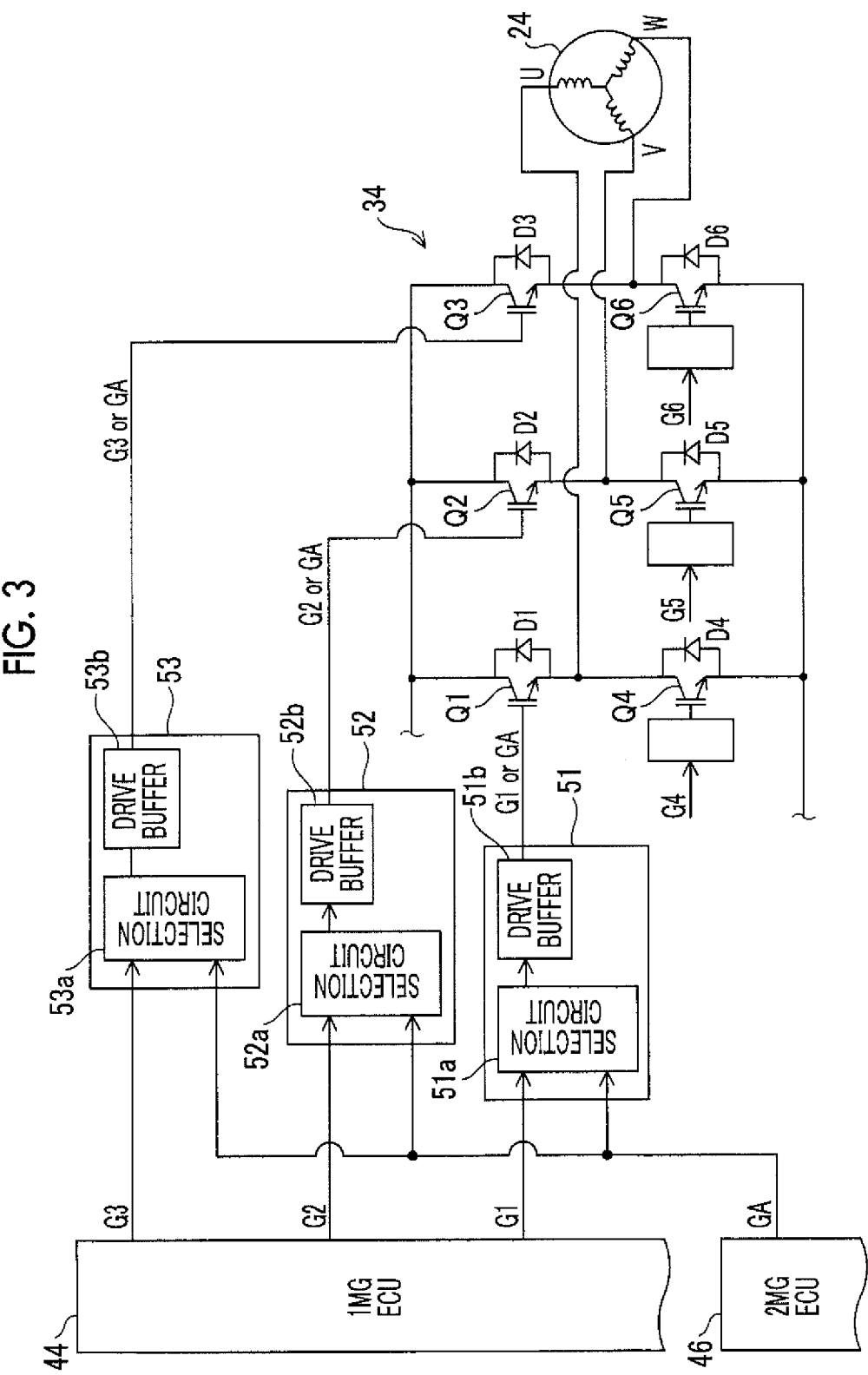
FIG. 3 is a diagram showing selection circuits 51a to 53a which output any one of first control signals G1 to G3 and a third control signal GA to a first inverter.

As described above, the second motor control unit 46 can output the third control signal GA for the first inverter 34, in addition to the second control signals G7 to G12 for the second inverter 36. The third control signal GA is a signal for simultaneously turning on the upper arm switching elements Q1 to Q3 of the first inverter 34. The third control signal GA output from the second motor control unit 46 is input to each of the drive circuits 51 to 53 connected to the upper arm switching elements Q1 to Q3 of the first inverter 34. As shown in FIG. 3, the drive circuits 51 to 53 respectively have selection circuits 51a to 53a and drive buffers 51b to 53b. The selection circuits 51a to 53a receive the first control signals G1 to G3 from the first motor control unit 44 and the third control signal GA from the second motor control unit 46 and output either of the first control signals G1 to G3 or the third control signal GA. Though in an example, in a case where both of the first control signals G1 to G3 and the third control signal GA are received simultaneously, the lower arm switching elements Q4 to Q6 are turned off, and then, the selection circuits 51a to 53a of this example output the third control signal GA. The drive buffers 51b to 53b level-shift the first control signals G1 to G3 or the third control signal GA output from the selection circuits 51a to 53a to voltages suitable for driving the upper arm switching elements Q1 to Q3. The drive buffers 51b to 53b have photocouplers (not shown), and an input side and an output side thereof are electrically insulated from each other. Other drive circuits 54 to 64 of the power conversion circuit 30 do not have circuits corresponding to the selection circuits 51a to 53a, but have circuits corresponding to the drive buffers 51b to 53b.

Next, a typical operation mode of the hybrid vehicle 10 will be described. The hybrid control unit 50 gives operation commands to each of the engine control unit 42, the first motor control unit 44, and the second motor control unit 46 based on various indexes, such as a user's operations and a vehicle state. The operation commands include target torque for the engine 22, the first motor 24, and the second motor 26. The engine control unit 42 controls the operation of the engine 22 based on the target torque for the engine 22 and other operation commands. The first motor control unit 44 generates and outputs the first control signals G1 to G6 and the fourth control signals G13, G14 based on the target torque of the first motor 24 and other operation commands, and controls the operations (that is, the operation of the first motor 24) of the DC-DC converter 32 and the first inverter 34. The second motor control unit 46 generates and outputs the second control signals G7 to G12 based on the target torque of the second motor 26 and other operation commands, and controls the operation (that is, the operation of the second motor 26) of the second inverter 36.

As an example, at the time of the start of the vehicle or during traveling in a middle and low speed range, the efficiency of the engine 22 becomes comparatively low. In such a situation, the target torque of the second motor 26 becomes a positive value, and the target torque of each of the engine 22 and the first motor 24 becomes zero. As a result, the hybrid vehicle 10 travels primarily using the second motor 26 without using the engine 22. During traveling in the middle and low speed range, the efficiency of the engine 22 becomes comparatively high. In such a situation, the target torque of the engine 22 becomes a positive value, and the target torque of the first motor 24 becomes a negative value. The target torque of the first motor 24 becoming a negative value means that the first motor 24 functions as a power generator. As a result, the hybrid vehicle 10 can travel primarily using the engine 22 (and the second motor 26 as necessary), and can charge the battery 38 with electric power generated by the first motor 24. During deceleration or stoppage of the vehicle (that is, when a brake operation is performed), the target torque of the engine 22 becomes zero, and the target torque of each of the first motor 24 and the second motor 26 becomes a negative value. As a result, the hybrid vehicle 10 makes the first motor 24 and the second motor 26 function as a power generator, thereby braking the vehicle while regenerating energy.

Figure 4:
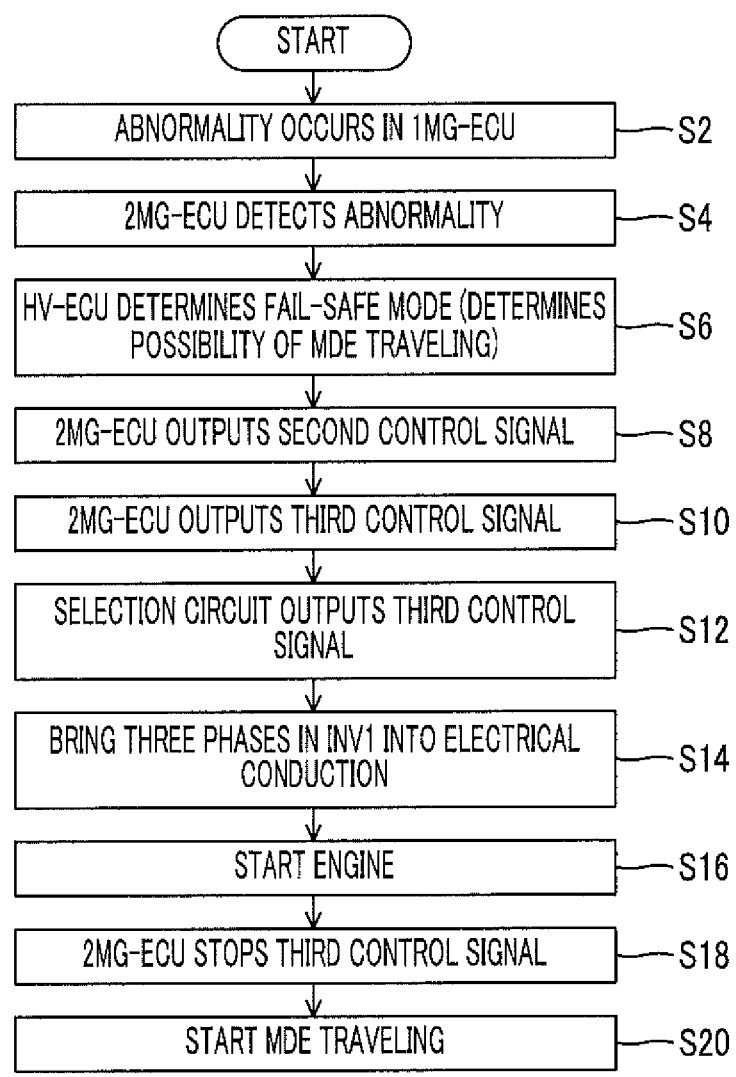
FIG. 4 is a flowchart showing a flow of an operation to start an engine using a second motor control unit 46.

During normal operation described above, in the hybrid vehicle 10, in a case where an abnormality occurs in the first motor control unit 44, a fail-safe operation according to the flowchart shown in FIG. 4 is executed. Hereinafter, the fail-safe operation will be described referring to FIG. 4. The first motor control unit 44 and the second motor control unit 46 are connected to be communicable with each other (see FIG. 1), and both motor control units mutually monitor normality/abnormality thereof. Accordingly, if an abnormality occurs in the first motor control unit 44 (S2 of FIG. 4), the abnormality is detected by the second motor control unit 46 (S4). If the abnormality of the first motor control unit 44 is detected, the second motor control unit 46 teaches the hybrid control unit 50 the abnormality.

The hybrid control unit 50 receives the abnormality of the first motor control unit 44 and performs determination of a fail-safe (F/S) mode (S6). This determination is not limited to the abnormality of the first motor control unit 44 and is executed when various abnormalities are detected in the hybrid vehicle 10, and a fail-safe mode according to the detected abnormality is selected from a plurality of fail-safe modes determined in advance. A plurality of fail-safe modes include, for example, a mode in which traveling of the hybrid vehicle 10 is inhibited readily, a first retreat traveling mode (hereinafter, referred to as an MD traveling mode) in which restricted traveling using the second motor 26 is permitted, and a second retreat traveling mode (hereinafter, referred to as an MDE traveling mode) in which the operation of the engine 22 is further permitted with respect to the MD traveling mode. In a case where an abnormality occurs in the first motor control unit 44, the hybrid control unit 50 generally selects the MDE traveling mode. However, when abnormalities not acceptable by the MDE traveling mode occur simultaneously, for example, when fail signals are already output from the drive circuits 51 to 56 of the first inverter 34, or the like, a fail-safe mode other then the MDE traveling mode is selected.

In a case where the MDE traveling mode is selected in the above-described determination (S6), the hybrid control unit 50 gives operation commands based on the MDE traveling mode to the engine control unit 42 and the second motor control unit 46. The first motor control unit 44 is not used in the MDE traveling mode since an abnormality occurs. The hybrid control unit 50 gives the operation commands, such as the target torque of the second motor 26, to the second motor control unit 46 according to a user's accelerator operation or the like. Upon receiving the operation commands, the second motor control unit 46 generates and outputs the second control signals G7 to G12 for the second inverter 36 such that the second motor 26 outputs the target torque (S8). If the second motor control unit 46 outputs the second control signals G7 to G12, the second motor 26 is driven, and the hybrid vehicle 10 travels. The target torque of the second motor 26 in the MDE traveling mode is restricted to a value lower than during normal operation.

If the engine 22 is in operation, the hybrid control unit 50 also gives the operation commands based on the MDE traveling mode to the engine control unit 42. When the engine 22 is stopped, it is necessary to start the engine 22. During normal operation, the hybrid control unit 50 gives the operation commands to the first motor control unit 44 in order to start the engine 22. Upon receiving the operation commands, the first motor control unit 44 outputs the first control signals G1 to G6 for the first inverter 34, and drives the first motor 24 to drive the engine 22. However, when an abnormality occurs in the first motor control unit 44, it is not possible to start the engine 22 using the first motor control unit 44. From this, the hybrid control unit 50 gives the operation commands for starting the engine 22 to the second motor control unit 46 during traveling of the hybrid vehicle 10 using the second motor 26.

Figure 5:
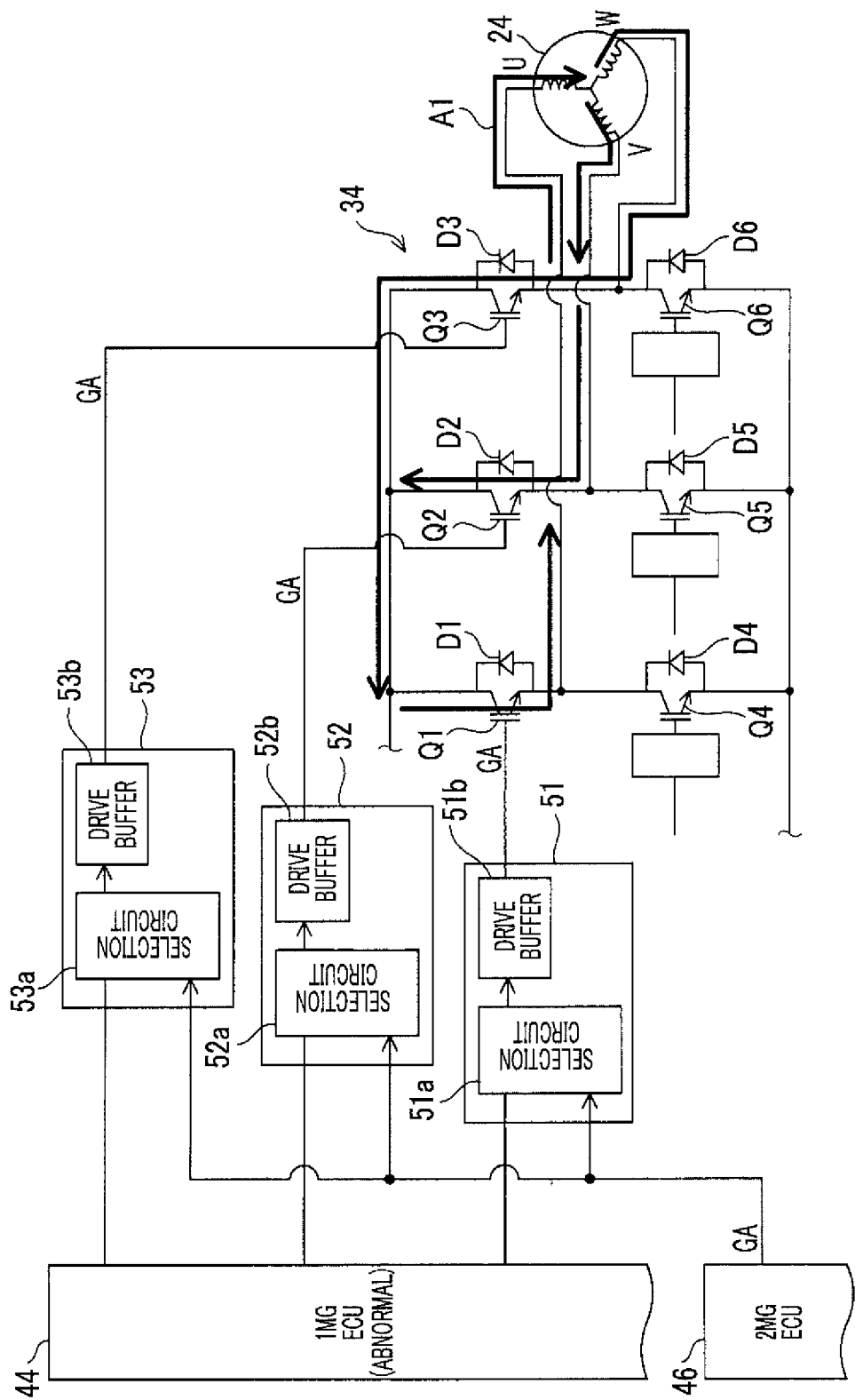
FIG. 5 is a diagram showing a mode in which, when the third control signal GA is output, a first motor generator 24 is short-circuited through the first inverter 34.

The second motor control unit 46 receives the operation commands from the hybrid control unit 50 and outputs the third control signal GA for the first inverter 34 (S10). As shown in FIG. 5, the third control signal GA from the second motor control unit 46 is input to the drive circuits 51 to 53 connected to the upper arm switching elements Q1 to Q3 of the first inverter 34. As described above, the drive circuits 51 to 53 respectively have the selection circuits 51*a* to 53*a*. If the third control signal GA is received, the lower arm switching elements Q4 to Q6 are turned off, and then, the selection circuits 51*a* to 53*a* output the third control signal GA to the drive buffers 51*b* to 53*b* regardless of the presence or absence of the first control signals G1 to G3 (S10). As described above, the third control signal GA is a signal for simultaneously turning on the upper arm switching elements Q1 to Q3 of the first inverter 34. Accordingly, if the second motor control unit 46 outputs the third control signal GA, the upper arm switching elements Q1 to Q3 of the first inverter 34 are turned on simultaneously. That is, in the first inverter 34, the three-phase upper arms are brought into electrical conduction simultaneously (S14).

Figure 6:
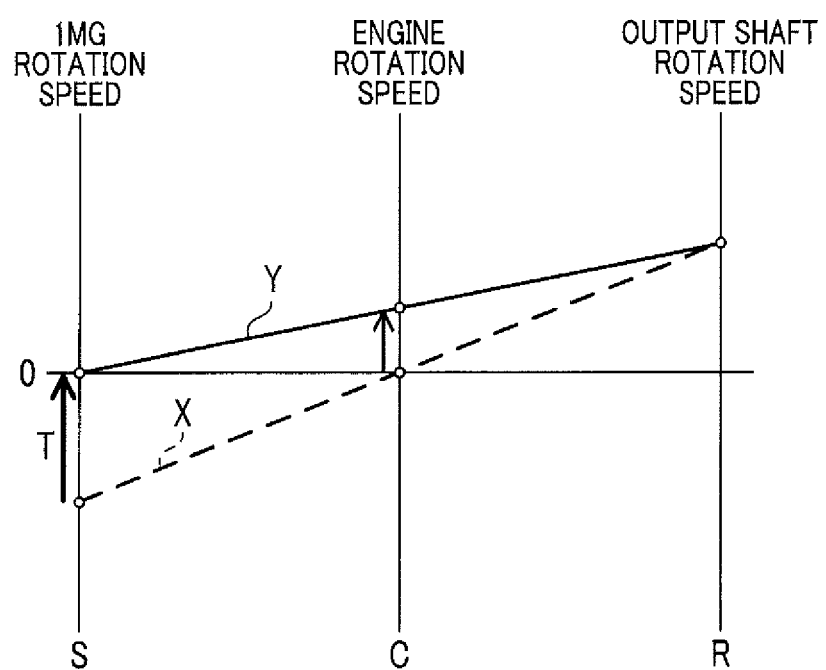
FIG. 6 is a collinear diagram of a planetary gear mechanism 28.

While the hybrid vehicle 10 is traveling, the output shaft 20 rotates. The output shaft 20 is connected to the crank shaft 22*a* of the engine 22 and the first motor 24 through the planetary gear mechanism 28. All of the switching elements Q1 to Q6 of the first inverter 34 are turned off until the second motor control unit 46 outputs the third control signal GA. In this state, since the first motor 24 does not generate substantial torque, as indicated by a broken line X in the collinear diagram of FIG. 6, the first motor 24 runs idle, and the crank shaft 22*a* of the engine 22 continues to be stopped. In this state, if the second motor control unit 46 outputs the third control signal GA, as indicated by an arrow A1 in FIG. 5, the first motor 24 is short-circuited through the first inverter 34, and accordingly, a braking force is generated. As indicated by a solid line Y in the collinear diagram of FIG. 6, if the first motor 24 generates a braking force T, the rotation of the first motor 24 is suppressed, whereby the crank shaft 22*a* of the engine 22 rotates. The hybrid control unit 50 starts the engine 22 using this rotation (S16 of FIG. 4).

If the engine 22 starts, the hybrid control unit 50 gives the operation commands to the second motor control unit 46 and stops the output of the third control signal GA (S18). Then, all of the switching elements Q1 to Q6 of the first inverter 34 are turned off. Then, the MDE traveling mode of the hybrid vehicle 10 is started (S20). In the MDE traveling mode, the hybrid vehicle 10 travels primarily with power of the second motor 26, and power generation with the engine 22 and the first motor 24 is performed. Electric power generated by the first inverter 34 is converted to DC power by the first inverter 34, and DC power is supplied to the second motor 26 through the second inverter 36. With this, it is possible to extend the traveling distance in the MDE traveling mode compared to the MD traveling mode not using the engine 22.

As described above, the hybrid vehicle 10 of this example can start the engine 22 using the second motor control unit 46 when an abnormality occurs in the first motor control unit 44. With this, the hybrid vehicle 10 can perform power generation with the engine 22 and the first motor 24 timely during retreat traveling due to the abnormality of the first motor control unit 44, and can improve the traveling distance in the retreat traveling.

The second motor control unit 46 outputs the third control signal GA to the first inverter 34 in order to start the engine 22. Since the third control signal GA is a signal for simultaneously turning on the three upper arm switching elements Q1 to Q3 of the first inverter 34, a common signal to the three upper arm switching elements Q1 to Q3 can be used. From this, the second motor control unit 46 may have at least one output port in order to output the third control signal GA for the three upper arm switching elements Q1 to Q3.

In the above-described example, the second motor control unit 46 may be configured such that the output of the third control signal GA is inhibited in a case where a short-circuit fault occurs in any of the switching elements Q1 to Q6 of the first inverter 34. For example, when a short-circuit fault occurs in the lower arm switching elements Q4 to Q6 of the first inverter 34, if the upper arm switching elements Q1 to Q3 of the first inverter 34 are turned on by the third control signal GA, the upper and lower arms are brought into electrical conduction simultaneously and an overcurrent may occur. If a short-circuit fault occurs in any of the switching elements Q1 to Q6, even if the engine 22 cannot start, the first inverter 34 does not function as a rectifier circuit correctly, and power generation with the first motor 24 cannot be performed with high efficiency. In order to avoid such trouble, it is effective to inhibit the output of the third control signal GA when a short-circuit fault occurs in the switching elements Q1 to Q6 of the first inverter 34. As described above, a short-circuit fault in the first inverter 34 can be detected by the drive circuits 51 to 56 of the first inverter 34, and the detection result (fail signal) can be taught to the second motor control unit 46. A method of detecting a short-circuit fault in the first inverter 34 is not particularly limited, and for example, a short-circuit fault in the first inverter 34 may be detected by monitoring a current between the first motor 24 and the first inverter 34.

Figure 7:
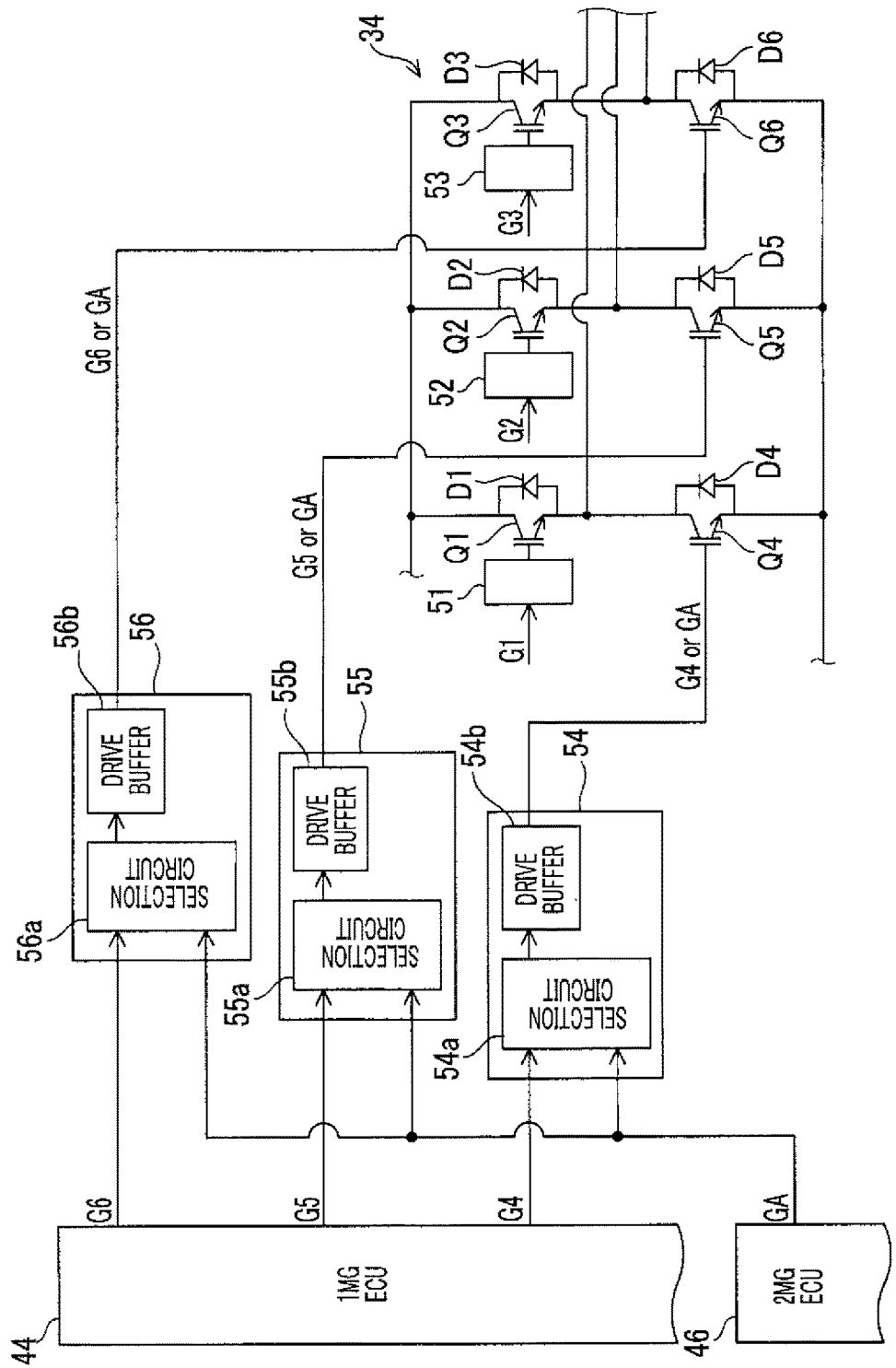
FIG. 7 is a diagram showing a modification example where the third control signal GA is input to lower arm switching elements Q4 to Q6 of the first inverter 34.

In the above-described example, the third control signal GA is a signal for simultaneously turning on the three upper arm switching elements Q1 to Q3 of the first inverter 34. In contrast, as shown in FIG. 7, the third control signal GA may be a signal for simultaneously turning on the three lower arm switching elements Q4 to Q6 of the first inverter 34. In this case, the third control signal GA from the second motor control unit 46 is input to the drive circuits 54 to 56 for the lower arm switching elements Q4 to Q6. The drive circuits 54 to 56 are respectively provided with selection circuits 54a to 56a. The selection circuits 54a to 56a output either of the first control signals G4 to G6 from the first motor control unit 44 or the third control signal GA from the second motor control unit 46 to the lower arm switching elements Q4 to Q6 through drive buffers 54b to 56b. Even in such a configuration, if the second motor control unit 46 outputs the third control signal GA, the first motor 24 is short-circuited through the first inverter 34. Accordingly, as in the above-described example, it is possible to start the engine 22.

Figure 8:
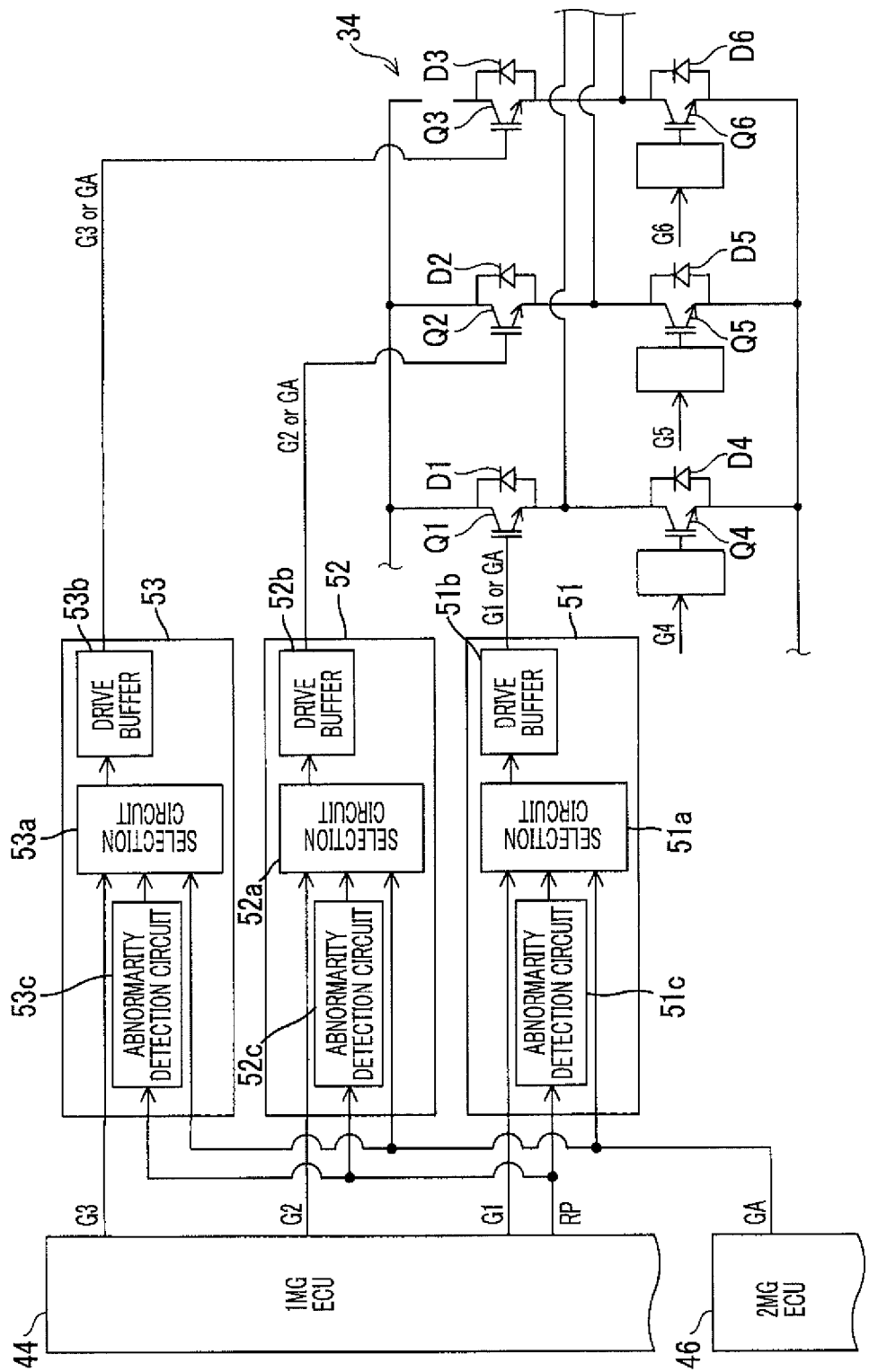
FIG. 8 is a diagram showing a modification example where abnormality detection circuits 51c to 53c are appended.

Referring to FIGS. 8 and 9, a modification example of the hybrid vehicle 10 will be described. As shown in FIG. 8, the hybrid vehicle 10 may further include abnormality detection circuits 51c to 53c which detect an abnormality in the first motor control unit 44. The abnormality detection circuits 51c to 53c are respectively provided in the drive circuits 51 to 53, and monitor a run pulse signal RP output from the first motor control unit 44, thereby detecting an abnormality occurring in the first motor control unit 44. However, the structure or arrangement of the abnormality detection circuits 51c to 53c is not particularly limited. In this modification example, the selection circuits 51a to 53a are respectively connected to the abnormality detection circuits 51c to 53c, and are configured to receive the detection results of the abnormality detection circuits 51c to 53c. The selection circuits 51a to 53a are configured to output the third control signal GA from the second motor control unit 46 to the first inverter 34 only when the abnormality detection circuits 51c to 53c detects an abnormality in the first motor control unit 44.

With the above-described configuration, although the first motor control unit 44 is normal, when the third control signal GA is erroneously output from the second motor control unit 46, it is possible to prevent the third control signal GA from being input to the first inverter 34. As shown in an A column of FIG. 9, in a normal state, the run pulse signal RP indicates normality, and the second motor control unit 46 does not output the third control signal GA. Accordingly, the first motor 24 is driven in a normal mode by the first control signals G1 to G6 output from the first motor control unit 44. As shown in a B column of FIG. 9, if an abnormality occurs in the first motor control unit 44, the run pulse signal RP indicates abnormality, and the second motor control unit 46 outputs the third control signal GA. In this case, the abnormality in the first motor control unit 44 is detected by the abnormality detection circuits 51c to 53c, and the selection circuits 51a to 53a output the third control signal GA to the first inverter 34. Accordingly, the first motor 24 is controlled to be short-circuited through the first inverter 34. As shown in a C column of FIG. 9, in a case where the third control signal GA is erroneously output, since the run pulse signal RP of the first motor control unit 44 is normal, the abnormality in the first motor control unit 44 is not detected by the abnormality detection circuits 51c to 53c. Accordingly, even if the third control signal GA is received from the second motor control unit 46, the selection circuits 51a to 53a do not output the third control signal GA to the first inverter 34. As a result, the first motor 24 is driven in the normal mode by the first control signals G1 to G6 output from the first motor control unit 44. In this way, even in a case where the third control signal GA is erroneously output, the first motor 24 can continue perform the normal operation without being affected by the third control signal GA.

Figure 10:
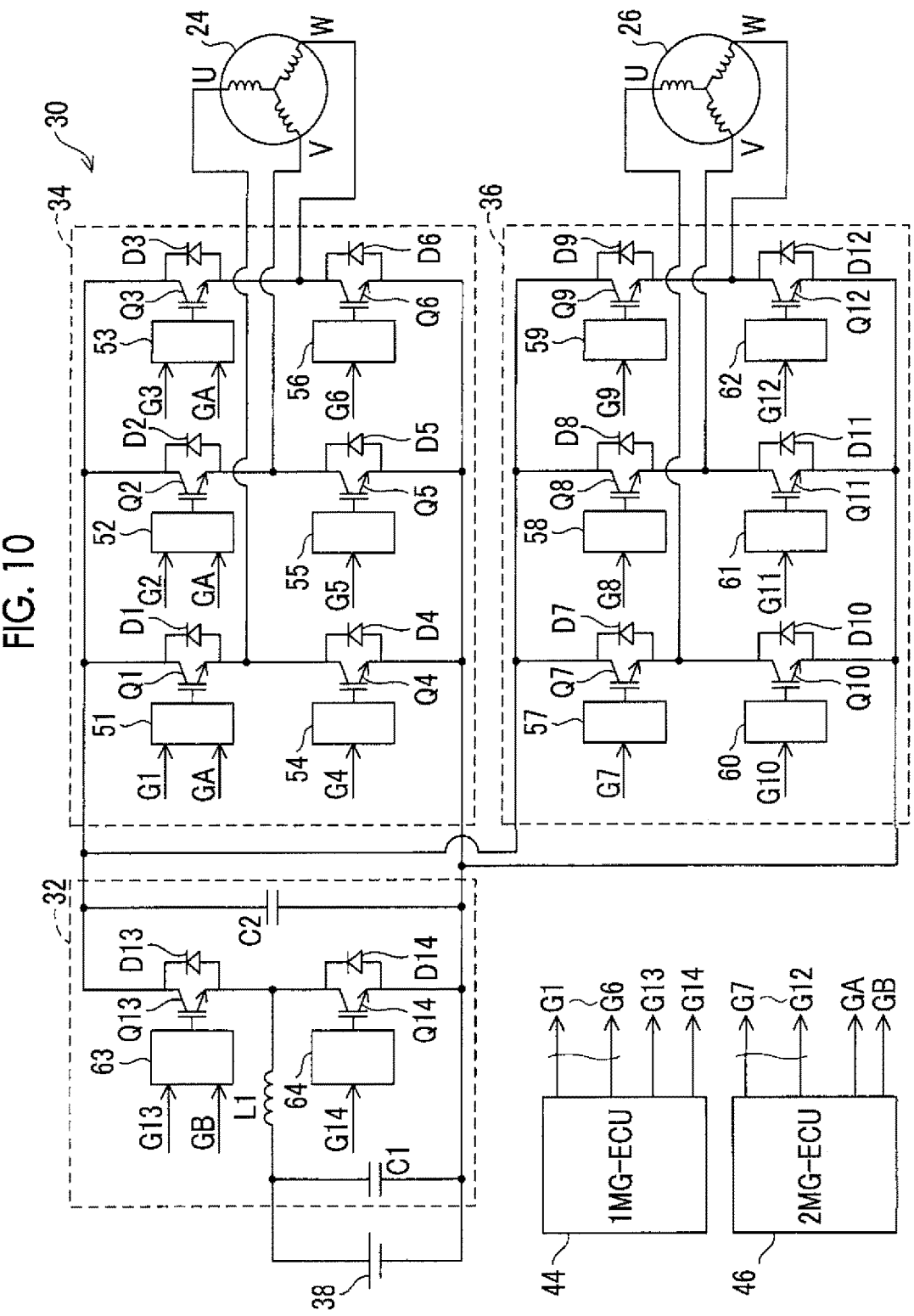
FIG. 10 is a diagram showing a modification example where the second motor control unit 46 is able to further output a fifth control signal GB.
Figure 11:
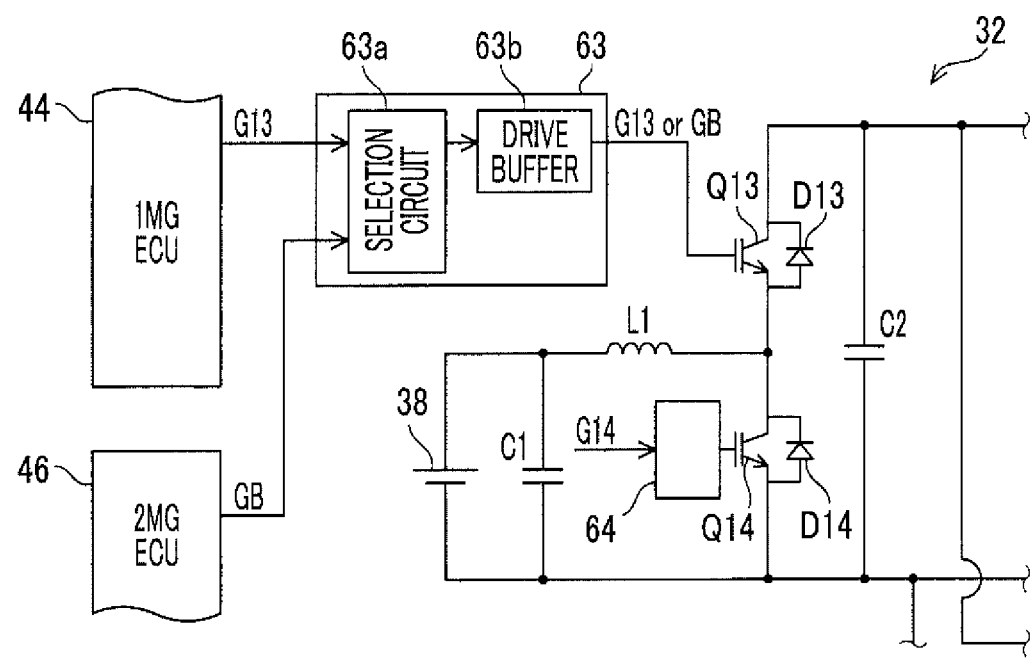
FIG. 11 is a diagram showing a main part of the modification example shown in FIG. 10.

Referring to FIGS. 10 to 13, another modification example of the hybrid vehicle 10 will be described. As shown in FIGS. 10 and 11, in this modification example, the second motor control unit 46 is configured to further output a fifth control signal GB for the DC-DC converter 32. The fifth control signal GB output from the second motor control unit 46 is input to a drive circuit 63 connected to the upper arm switching element Q13 of the DC-DC converter 32. As shown in FIG. 11, the drive circuit 63 includes a second selection circuit 63a. The second selection circuit 63a outputs either of the fourth control signal G13 from the first motor control unit 44 or the fifth control signal GB from the second motor control unit 46 to the upper arm switching element Q13 of the DC-DC converter 32 through a drive buffer 63b. The fifth control signal GB is a signal for turning on the upper arm switching element Q13.

As described above, normally, the operation of the DC-DC converter 32 is controlled by the fourth control signals G13, G14 from the first motor control unit 44. Accordingly, when an abnormality occurs in the first motor control unit 44, the operation of the DC-DC converter 32 cannot be controlled. The hybrid vehicle 10 can perform power generation with the engine 22 and the first motor 24 in the MDE traveling mode. However, if the upper arm switching element Q13 of the DC-DC converter 32 is the off state, electric power generated by the first motor 24 cannot be supplied to the battery 38, and the battery 38 cannot be charged.

Figure 12:
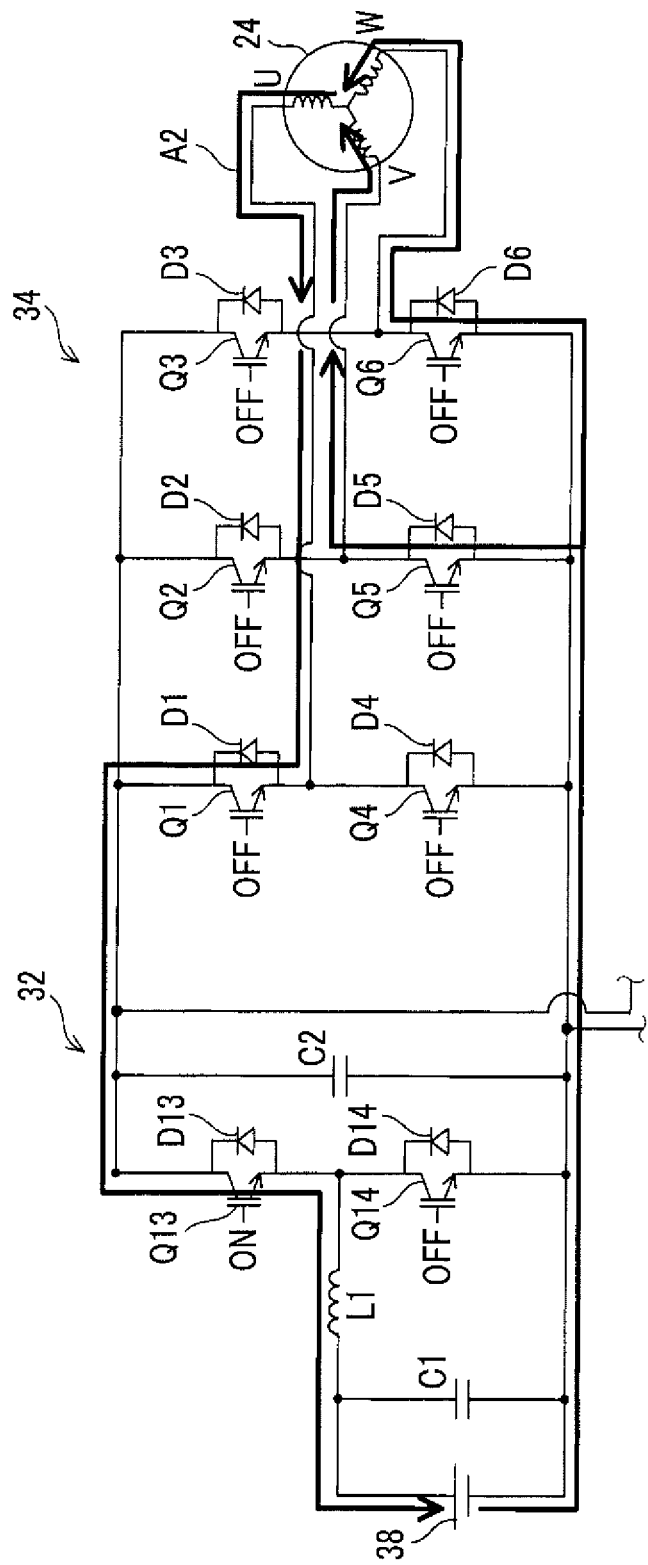
FIG. 12 is a diagram showing a mode in which, when the fifth control signal GB is output, electric power generated by the first motor generator 24 is supplied to a battery 38.
Figure 13:
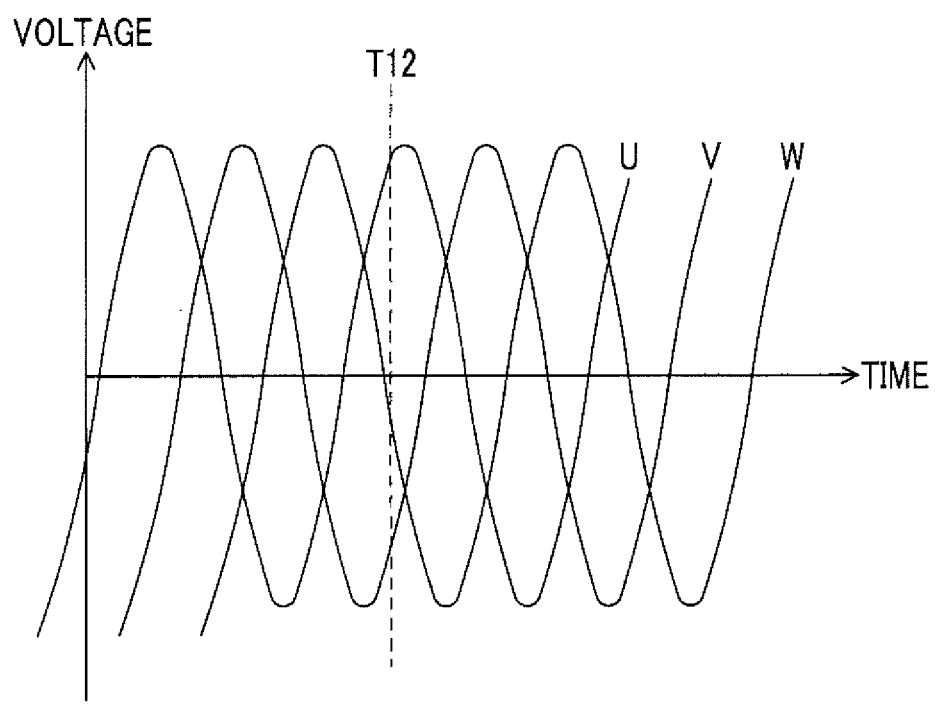
FIG. 13 is a graph showing voltages at respective terminals of a U-phase, a V-phase, and a W-phase of the first motor generator 24 during power generation.

In regard to the above-described point, in this modification example, the second motor control unit 46 is configured to output the fifth control signal GB after the MDE traveling mode is started according to the flow shown in FIG. 4. The fifth control signal GB from the second motor control unit 46 is input to the upper arm switching element Q13 of the DC-DC converter 32 through the second, selection circuit 63a. Then, the upper arm switching element Q13 is turned on. If the upper arm switching element Q13 is turned on, the battery 38 is electrically connected to the first inverter 34 through the DC-DC converter 32. With this, as shown in FIG. 12, electric power generated by the first motor 24 is supplied to the battery 38, thereby charging the battery 38. An arrow A2 in FIG. 12 indicates the flow of a current at time T12 of the graph shown in FIG. 13. The graph of FIG. 13 shows a time-dependent change in voltage at each of the terminals of the U-phase, the V-phase, and the W-phase of the first motor 24 in the MDE traveling mode.

As described above, according to the modification example shown in FIGS. 10 and 11, even in a case where an abnormality occurs in the first motor control unit 44, it is possible to start the engine 22 to perform power generation with the first motor 24, and to charge the battery 38 with electric power generated by the first motor 24. With this, it is possible to improve the traveling distance in the retreat traveling due to the abnormality of the first motor control unit 44. The fifth control signal GB may be a signal for continuously turning on the upper arm switching element Q13 of the DC-DC converter 32 or may be a signal for intermittently turning on the upper arm switching element Q13. In the latter case, the DC-DC converter 32 can deboost DC power from the first inverter 34 properly and can supply DC power to the battery 38.

Although the specific examples of the disclosure has been described above in detail, these are just illustrative, and are not intended to limit the scope of the claims. For example, the first motor control unit 44 is an example of a first controller described in the claims, but does not limit the configuration of the first controller. The second motor control unit 46 is an example of a second controller described in the claims, but does not limit the configuration of the second controller.

The art described in the claims include modifications and variations of the specific examples illustrated above. Technical matters to be learned from the disclosure of this specification are listed below. The technical matters described below are respectively independent technical matters, and are technically useful alone or in various combinations.

This specification discloses the hybrid vehicle (10). The hybrid vehicle includes the engine (22), the first motor generator (24), the output shaft (20) connected to the drive wheels (14), the planetary gear mechanism (28) configured to connect the engine, the first motor generator, and the output shaft to one another, and the second motor generator (26) connected to the output shaft. The hybrid vehicle further includes the battery (38) electrically connected to the first motor generator and the second motor generator, the first inverter (34) configured to convert electric power between the battery and the first motor generator, the second inverter (36) configured to convert electric power between the battery and the second motor generator, the first controller (44) configured to output the first control signals (G1 to G6) for the first inverter, the second controller (46) configured to output the second control signals (G7 to G12) for the second inverter and the third control signal (GA) for the first inverter, and the selection circuits (51a to 53a; 54a to 56a) configured to output either of the first control signals from the first controller or the third control signal from the second controller to the first inverter. The first inverter has a plurality of arms each including the upper arm switching elements (Q1 to Q3) and the lower arm switching elements (Q4 to Q6). The third control signal is a signal for simultaneously turning on either of the upper arm switching elements or the lower arm switching elements of a plurality of arms of the first inverter. The second controller can output the third control signal to start the engine while outputting the second control signals to drive the second motor generator when an abnormality occurs in the first controller.

According to this hybrid vehicle, even when an abnormality occurs in the first controller, it is possible to start the engine.

In the above-described hybrid vehicle, the second controller may be configured such that the output of the third control signal is inhibited when a short-circuit fault occurs in the upper arm switching elements or the lower arm switching elements of the first inverter. With such a configuration, it is possible to prevent the upper and lower arms from being brought into electrical conduction simultaneously through the switching elements, in which a short-circuit fault occurs, when the third control signal is output.

The hybrid vehicle may further include the abnormality detection circuits (51c to 53c) which detect the abnormality of the first controller. In this case, the selection circuits are respectively connected to the abnormality detection circuits, and can output the third control signal from the second controller to the first inverter only when abnormality detection circuits detect the abnormality of the first controller. With such a configuration, in a case where the second controller erroneously outputs the third control signal, it is possible to prevent the third control signal from being input to the first inverter. With this, even in a case where the third control signal is erroneously output, if no abnormality occurs in the first controller, the first motor can continues to operate normally without being affected by the third control signal.

The above-described hybrid vehicle may further include the DC-DC converter (32) which transforms DC power between the battery and the first inverter. The DC-DC converter has the upper arm switching element (Q13) and the lower arm switching element (Q14) which are controlled by the fourth control signals (G13, G14) output from the first controller. In this case, the second controller may further output the fifth control signal for turning on the upper arm switching element of the DC-DC converter after the engine is started by the second control signals and the third control signal. With such a configuration, instead of the first controller in which an abnormality occurs, the second controller can turn on the upper arm switching element of the DC-DC converter. With this, electric power generated by the first motor generator can be supplied to the battery, thereby charging the battery.

What is claimed is:

1. A hybrid vehicle comprising:
   an engine;
   a first motor generator;
   an output shaft connected to drive wheels;
   a planetary gear mechanism configured to connect the engine, the first motor generator, and the output shaft to one another;
   a second motor generator connected to the output shaft;
   a battery electrically connected to the first motor generator and the second motor generator;
   a first inverter configured to convert electric power between the battery and the first motor generator;
   a second inverter configured to convert electric power between the battery and the second motor generator;
   a first controller configured to output a first control signal for the first inverter;
   a second controller configured to output a second control signal for the second inverter and a third control signal for the first inverter; and
   a selection circuit configured to output either of the first control signal from the first controller or the third control signal from the second controller to the first inverter, wherein the first inverter has a plurality of first upper arm switching elements and a plurality of first lower arm switching elements, the third control signal includes a signal for simultaneously turning on either of the plurality of first upper arm switching elements or the plurality of first lower arm switching elements, and the second controller starts the engine by outputting the third control signal while outputting the second control signal to drive the second motor generator when an abnormality occurs in the first controller.

2. The hybrid vehicle according to claim 1, wherein the second controller is configured not to output the third control signal when a short-circuit fault occurs in at least one of the plurality of first upper arm switching elements or at least one of the plurality of first lower arm switching elements.

3. The hybrid vehicle according to claim 1, further comprising:

an abnormality detection circuit configured to detect an abnormality in the first controller, wherein the selection circuit is connected to the abnormality detection circuit and is configured to output the third control signal from the second controller to the first inverter when the abnormality detection circuit detects the abnormality in the first controller.

4. The hybrid vehicle according to claim 1, further comprising:

a DC-DC converter configured to transform DC power between the battery and the first inverter, wherein the DC-DC converter has a second upper arm switching element and a second lower arm switching element which are controlled by a fourth control signal output from the first controller, and the second controller is configured to further output a fifth control signal for turning on the second upper arm switching element after the engine is started by the second control signal and the third control signal.

5. A hybrid vehicle comprising:

an engine;

a first motor generator;

an output shaft connected to drive wheels;

a planetary gear mechanism including a sun gear connected to the first motor generator, a planetary gear connected to the engine through a carrier, and a ring gear connected to the output shaft;

a second motor generator connected to the output shaft;

a battery electrically connected to the first motor generator and the second motor generator;

a first inverter having a plurality of first upper arm switching elements and a plurality of first lower arm switching element, the first inverter being configured to convert electric power between the battery and the first motor generator;

a second inverter configured to convert electric power between the battery and the second motor generator;

a first controller configured to control an operation of the first inverter and to output a first control signal for driving the first motor generator;

a second controller configured to control an operation of the second inverter and to output a second control signal for driving the second motor generator and a third control signal for simultaneously turning on either of the plurality of first upper arm switching elements or the plurality of first lower arm switching elements; and a selection circuit configured to either of the first control signal from the first controller or the third control signal from the second controller to the first inverter and to output the third control signal to the first inverter when an abnormality occurs in the first controller.

6. The hybrid vehicle according to claim 5, further comprising:

a DC-DC converter having a second upper arm switching element and a second lower arm switching element, the DC-DC converter being configured to transform DC power between the battery and the first inverter, wherein the first controller is configured to output a fourth control signal for controlling the DC-DC converter, and the second controller is configured to output the second control signal and the third control signal, and then, to output a fifth control signal for turning on the second upper arm switching element after the engine is started.

* * * * *